United States Patent [19]
Fye

[11] Patent Number: 5,841,969
[45] Date of Patent: Nov. 24, 1998

[54] SINGLE BUS ARCHITECTURE SUPPORTING SUBSYSTEMS OF VARIOUS CRITICALITY LEVELS

[75] Inventor: James C. Fye, Scottsdale, Ariz.

[73] Assignee: Honeywell Inc.

[21] Appl. No.: 696,419

[22] Filed: Aug. 13, 1996

[51] Int. Cl.[6] .................................................. G06F 11/14
[52] U.S. Cl. ............................ 395/185.09; 315/185.01; 315/185.04; 315/185.07; 315/185.08
[58] Field of Search ....................... 395/185.01, 185.07, 395/185.02, 185.05, 185.08, 182.22, 182.21, 185.09, 500; 371/67.1, 68.1

[56] References Cited

U.S. PATENT DOCUMENTS

| | | | |
|---|---|---|---|
| 4,118,792 | 10/1978 | Struger et al. | 364/900 |
| 4,417,302 | 11/1983 | Chimienti et al. | 364/200 |
| 5,502,812 | 3/1996 | Leyre et al. | 395/182.08 |
| 5,544,150 | 8/1996 | Fujimoto et al. | 370/14 |
| 5,577,042 | 11/1996 | McGraw et al. | 370/85.7 |
| 5,590,329 | 12/1996 | Goodnow et al. | 395/708 |
| 5,602,857 | 2/1997 | Zook et al. | 371/40.1 |
| 5,629,949 | 5/1997 | Zook et al. | 371/37.1 |

OTHER PUBLICATIONS

K. Hoyme et al.: "ARINC 629 and SAFEbus*: Data Buses for Commercial Aircraft" Scientific Honeyweller, vol. 11, No. 1, 1991, USA, pp. 57–70, XP000289742 See the whole document.

Chau S.N. et al.: "A Multi–Mission Space Avionics Architecture" 1996 IEEE Aerospace Applications Conference, vol. 1, 3 Feb. 1996, Aspen, CO, USA, pp. 165–176, XP002044457 see p. 165–p.166, left–hand column, line 18 see p. 167, right–hand column, line 12–p. 171, right–hand column, line 21; Fig. 4–6.

*Primary Examiner*—Robert W. Beausoliel, Jr.
*Assistant Examiner*—Pierre Eddy Eliscia
*Attorney, Agent, or Firm*—Charles J. Ungemach

[57] ABSTRACT

Communications systems architecture using a single shared resource bus to interconnect a plurality of subsystems each handling information having a first predetermined importance level and an error detect wrapper for encoding information to and from each such subsystem to detect errors in transmission along the shared resource bus. A heartbeat monitor is also provided for use in those subsystems handling information having a second predetermined level of importance to disable the subsystem if an error occurs within the subsystem.

8 Claims, 1 Drawing Sheet

SINGLE BUS ARCHITECTURE SUPPORTING SUBSYSTEMS OF VARIOUS CRITICALITY LEVELS

BACKGROUND OF INVENTION

1. Field of the Invention

The present invention relates to communications systems and more particularly highly cost effective communications systems capable of interconnecting various kinds of subsystems which handle information having varying levels of importance with a minimum of bussing.

2. Description of the Prior Art

Many highly complicated control and management systems exist today requiring communications between elements thereof. For example, in modern aircraft management, there are a considerable number of condition sensors and data sources which operate with various sorts of processors to produce a plurality of control and display functions necessary for the operation and maintenance of the aircraft. The aircraft may be equipped with inertial reference sensors such as gyros and accelerometers which produce signals that are processed by computers to provide control signals to the aircraft control surfaces to control the speed and attitude of the aircraft. The aircraft may also utilize global positioning capabilities in which information from remote satellites and from ground transmitters is obtained by a receiver and processed in a computer to provide signals for use in the display and control of aircraft position. There are many other functions performed in modern aircraft systems all of which may require communication back and forth between sensors, processors, data sources, control systems and indicating devices. Some of the subsystems are considered "critical" in that mis-information could be disastrous to the safety of the aircraft while other subsystems are considered "non-essential" so that failure in the system will have no adverse effect on the aircraft safety. The information handled by the subsystems will thus have various degrees of criticality or levels of importance and each subsystem may be provided with safeguards consistent with its level of importance. For example, "fail safe" operation is often provided for subsystems considered critical while no protection at all may be provided for non-essential subsystems. The level of importance of the information handled by a subsystem is determined in advance and the safeguards for assuring the proper protection are usually built-in to the subsystem.

In the prior art, each subsystem usually utilized its own internal communications system which is designed to handle its level of importance. For example, in landing, the altitude control may be considered so critical that a "fail safe" or "fail operational" system is required. Furthermore, systems may be established to check transmission of information between sensors, control surfaces and signal processors to assure transmission reliability. Redundant sensors and processors may also be employed to check each other to assure that failure of a component is always detected before a catastrophic occurrence results. On the other hand, systems monitoring the air conditioning aboard the aircraft may be considered so non-essential that no precautions need be taken to detect any errors.

In the prior art, each subsystem has usually been connected independently to the aircraft components it deals with and a problem has developed because the cost of providing each subsystem with its own communications system becomes great because of duplication of elements that have the capability of doing much more than they are required to do. Attempts at using common interconnections between subsystems has been confused by the operation of the safeguards for error detection and the introduction of additional errors because of the common interconnections.

BRIEF DESCRIPTION OF THE INVENTION

The present invention provides a communication architecture which requires a minimum of communication busses and provides for the common determination of fault tolerance based on the criticality of the subsystems. This is accomplished by having multiple subsystems, each of which may require different levels of fault detection, share a common bus and in which the provision of fault detection is supplied or not depending on the criticality of the subsystem. The subsystems may be interchangeable so that the bus system architecture need not be re-designed for each combination of subsystems. Each subsystem will, as is presently the case, have the capability of detecting faults in its internal equipment, as for example, cross checking the outputs of redundant sensors and determining if the differences between their outputs is great enough to disable the subsystem. The present invention will supply additional error checking functions to present subsystems. "Heartbeat monitors" may be employed so that when failures occur within subsystems orderly shutdown of safety sensitive functions can occur. A coding device in the form of a "bus bridge" and "error detect wrapper" will be employed in important subsystems to assure that communications over the shared bus will arrive at their destination in the same form as they left the subsystem. In other words, a fault check will be supplied to detect errors in transmission over the shared bus.

DETAILED DESCRIPTION OF THE PREFERRED EMBODIMENTS

Figure 1:
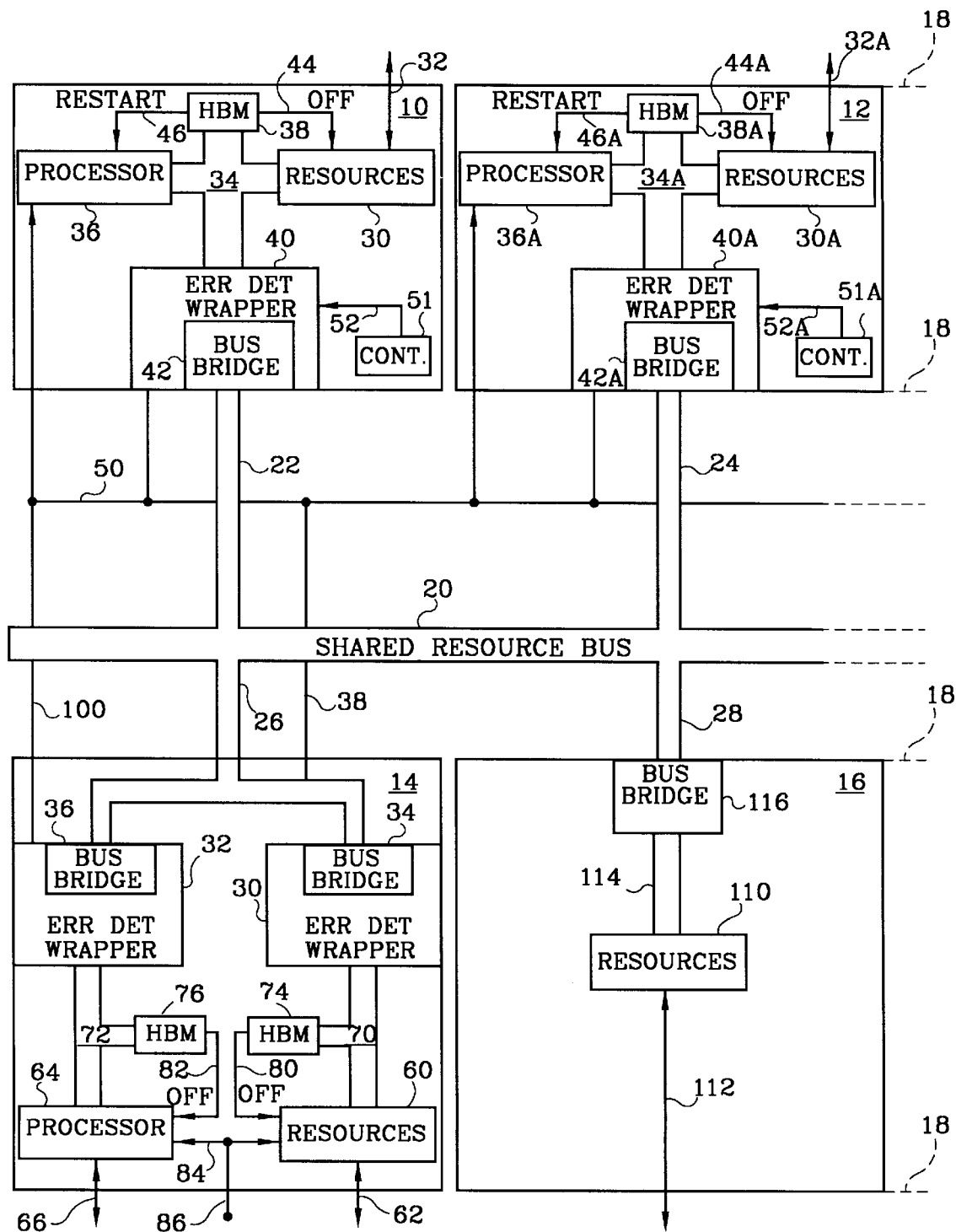
FIG. 1 shows a block diagram of a sample set of subsystems using a shared bus in accordance with the present invention.

In describing the present invention, the environment of an aircraft will be used as an example although it will be understood that the present invention can find utility in any communications system employing multiple subsystems in an overall operating system. For convenience, "subsystem" is used herein to refer to any of a variety of functions utilized in the operation of the overall system, which, in an aircraft may refer to such things as global position systems, flight management systems, almanac or other data bases, air conditioning systems etc.

In FIG. 1, four subsystems identified by reference numerals 10, 12, 14 and 16 are shown as examples but, as shown by broken lines 18, other subsystems may be included. A single shared resource bus 20 is shown connected to subsystem 10 by a connection 22, to subsystem 12 by a connection 24, to subsystem 14 by a connection 26 and to subsystem 16 by a connection 28. It is seen that all of the subsystems are interconnected by bus 20 so that information may be passed between any or all of them.

Subsystem 10 is shown to contain a resources box 30 which may be a data base or may be an interface circuit such as an ARINC 429 or RS-422 available in the market which is used to receive information external to the system such as from gyros and accelerometers over an input/output line 32. Resources box 30 operates on the information from input/output line 32 and modifies it or characterizes it for use by the other equipment in the subsystem 10. Resources box 30 may also operate on internally generated information in subsystem 10 to characterize it for use by external equipment such as the control surfaces of the aircraft over the input/output line 32. Resources box 30 is connected by an internal bus 34 to a processor 36, a heartbeat monitor 38 and an error detection wrapper box 40 to be further described. The processor may be a standard microprocessor which operates on the signals from resources box 30 or other signals on bus 34 to produce outputs for use by other subsystems or for use in control of the aircraft. The information received and transmitted by the processor 36 is controlled by a bus bridge 42 shown as part of the error detect wrapper 40. Bus bridge 42 may be a standard bridge which joins two dissimilar busses so as to make them compatible and will be programmed to know what transmissions to send and receive in a normal address/data transaction.

Heartbeat monitor 38, sometimes called a watchdog timer circuit, is used to detect a fault in the operation of the processor box 36 and by connections 44 operates to disable the resources box 30 when this occurs. Also, by a connection 46, heartbeat monitor 38 may restart the operation of the processor box 36 when appropriate.

Error detect wrapper 40, may be a well known logic device such as a cyclic redundancy checker, for example, and is programmed to encode information from bus 34 before it is passed through bus bridge 42 to the shared resource bus 20 so as to enable other error detect wrappers of other subsystems to check the information validity to ensure reliability of this information over the shared resource bus 20. Likewise, error detect wrapper 40 checks the code which has been put on information by other subsystems and transmitted over the shared resource bus 20 through the bus bridge 40 to assure it is proper before sending it to the bus 34. When an error is detected by an error detect wrapper, it may inform the processor 36 which is doing the transmitting and/or receiving and, if desired, it may inform other processors in other subsystems, by a transmission over a line 50 shown connected to each error detect wrapper and each processor. Thus each processor knows when an error in transmission has occurred and is enabled to account for it and/or take corrective action.

It should be noted that the operation of error detect wrapper 40 may be modified or disabled to an extent desired by a control device 51 producing a signal on an input 52. This often might be used in cases where the criticality of information from shared resource bus 20 is such that the transmission check does not need to be complete, or is no longer necessary at all.

Subsystem 12 is substantially the same as subsystem 10 and may receive entirely different signals of entirely different criticality, as, for example, where, subsystem 10 might respond to analog inputs from gyros and accelerometers, subsystem 12 might respond to digital inputs from a global position system. On the other hand, subsystem 12 may be a repetition of the function or apparatus of subsystem 10 in order to provide a fail safe system. Subsystem 12 is shown with the same reference numerals as subsystem 10 but with the letter "A" associated therewith and will not be further described.

Subsystem 14 is shown with two sets of structures, one for each of the redundant subsystems, in order to provide a fail safe redundant operation, when desired as will be further explained. In subsystem 14, a first resources block 60 is shown connected to remote devices (not shown) via input/output connection 62. A second resources box 64 is shown connected to remote devices (not shown) via input/output connection 66. Resource boxes 60 and 64 and input/output connections 62 and 66 have the same function described in connection with resources box 30 and input/output connection 32 in subsystem 10 except they will be connected to different remote devices. Alternately, both resources boxes 60 and 64 may be connected to substantially identical sensors so that the outputs thereof can be compared for another way of fail safe operation.

As with subsystem 10, internal buses 70 and 72 are shown in subsystem 14 and operate to distribute information within the system. Heartbeat monitors 74 and 76 monitor the availability of the "processing path" (which includes the availability of the processor(s), the shared resource bus 20 etc.) and determine if a failure has occurred. If so, the resources boxes 60 and 64 may be turned off via connection 80 and 82. Resources boxes 60 and 64 are also connected to each other via a connection 84 and to external devices (not shown) via a connection 86 to provide, for example, common inputs to be processed separately via resource boxes 60 and 64 when such operation is desired. Internal busses 70 and 72 also connect resources boxes 60 and 64 to error detect wrappers 90 and 92 which are wrapped around bus bridges 94 and 96 respectively. It is noted that subsystem 14 contains no processor although one could be provided. In the present case, processing for subsystem 14 may be supplied by a processor in another subsystem, for example processor 36 in subsystem 10. This is accomplished through the shared resource bus 20 to which bus bridges 94 and 96 are connected by connection 26. Lines 98 and 100 connect the error detect wrappers 90 and 92 to line 50 so as to inform the processors connected thereto of any fault occurring such as a transmission failure of shared resource bus 20.

Subsystem 16 is shown as a simple non-essential subsystem not requiring any failure checking. As such, a single resources box 110 is shown having a connection to external devices (not shown) by a connection 112 and by an internal bus 114 to a bus bridge 116 connected to the shared resource bus 20 by connection 28. Since the function of subsystem 16 is non-essential, no error detect wrapper is used in connection with bus bridge 116.

As a further example of the flexibility of this architecture, a fail safe "dual computational lane" system can be supported when subsystem 12 is a repetition of subsystem 10 and when processor 36 is connected to heartbeat monitor 76 and resources 64 through busses 34, 22, 20, 26, and 72 while processor 36A is connected to heartbeat monitor 74 and resources 60 through busses 34A, 24, 20, 26 and 70. If the "lanes" don't agree, corrective action can be taken.

It should also be noted that the architecture may provide exclusive access of the various processors to the various resources (when required) and that each transmission will be allotted a predetermined amount of time. If the time exceeds the predetermined amount, a failure exists and the resources may be shut off It is seen that the apparatus of FIG. 1 will provide interconnection between a variety of subsystems and with a single shared resource bus to provide both economy and flexibility in the communication system. Any of the subsystems described in connection with FIG. 1 can be replaced with different subsystems without having to change the interconnection nor modify the operation more than slightly.

While the subsystems 10, 12, 14 and 16 have been shown as separate entities, this does not necessarily mean that they are physically separated since they may all reside on the same or several circuit card assemblies. Many other modifications and changes will occur to those having skill in the art and I do not wish to be limited to the specific structures used in connection with the preferred embodiment described herein.

The embodiments of the invention in which an exclusive property or right is claimed are defined as follows:

1. An architecture for use with interconnecting a plurality of avionics subsystems of an overall system, each subsystem operating on information useful in the overall system which information may be of various levels of importance to the overall system, each subsystem having a bus bridge operable to conduct input and output information to and from its subsystem, comprising:

a single shared resource bus connected to each of the bus bridges; and an error detect wrapper connected to those bus bridges associated with subsystems operating on information having at least a first predetermined level of importance to the overall system, said error detect wrapper encoding information being sent from a subsystem to the shared resource bus and checking the coding of information received from the shared resource bus to detect if there has been any transmission error between a sending subsystem and a receiving subsystem.

2. Apparatus according to claim 1 further including a processor associated with a subsystem for processing information to and from one or more of the subsystems and further including means connected between each error detect wrapper and the processor to inform the processor of a transmission error when it occurs.

3. Apparatus according to claim 1 further including a heartbeat monitor in each subsystem operating on information having at least a second predetermined level of importance, said heartbeat monitor operating to produce a fault signal upon the occurrence of an error within the subsystem.

4. Apparatus according to claim 3 further including means to disable any subsystem having a heartbeat monitor producing a fault signal.

5. Apparatus according to claim 1 wherein each subsystem includes resources apparatus to receive information from remote sources and to characterize such information for use in the subsystem.

6. Apparatus according to claim 5 further including a heartbeat monitor connected to the resources apparatus in each subsystem operating on information having at least a second predetermined level of importance, said heartbeat monitor operating to produce a fault signal upon the occurrence of an error in the subsystem.

7. Apparatus according to claim 1 further including control means operable to enable and disable the error detect wrapper to a predetermined desired extent.

8. Apparatus according to claim 7 where the control means enables and disables the error detect wrapper to the desired extent in accordance with the level of importance of the information.

* * * * *